United States Patent [19]

Hartmann

[11] 3,755,761

[45] Aug. 28, 1973

[54] SURFACE WAVE TRANSVERSAL FREQUENCY FILTER

[75] Inventor: Clinton S. Hartmann, Dallas, Tex.

[73] Assignee: Texas Instruments Incorporated, Dallas, Tex.

[22] Filed: Dec. 30, 1971

[21] Appl. No.: 214,362

[52] U.S. Cl. .................. 333/70 T, 310/8.1, 310/9.8, 333/30, 333/72

[51] Int. Cl. ...... H03h 9/26, H03h 9/32, H04r 17/00

[58] Field of Search ...................... 333/70 T, 72, 70, 333/28, 9.8; 310/8, 8.1

[56] References Cited

UNITED STATES PATENTS

| | | | |
|---|---|---|---|
| 3,663,899 | 5/1972 | Dieulesaint et al. | 333/70 T |
| 3,551,837 | 12/1970 | Speiser et al. | 333/72 X |

*Primary Examiner*—Rudolph V. Rolinec
*Assistant Examiner*—Marvin Nussbaum
*Attorney*—Harold Levine et al.

[57] ABSTRACT

Elastic waves propagating at the surface of a solid substrate are generated by a transducer-filter of interdigitated electrodes patterned to pass a particular wavelength of frequencies at an established center frequency. Interdigitated electrodes of the filter may be either uniformly spaced one-half wavelength apart or spaced to produce a desired function. The overlapping length of the electrode configuration for each filter varies in accordance with a weighting function usually approximating sin $x/x$. To generate an output signal having a desired frequency distribution between band pass and band stop regions, each filter comprises two sections of an array of three or more taps of interdigitated electrodes. These taps correspond to a fundamental, third, fifth, etc., time harmonic of the band pass-band stop periodicity. The two sections are arranged back to back on the substrate, that is, with the fundamental tap of each section adjacent and the highest time harmonic tap of each section at the ends of the filter. An interchange of the band pass and band stop regions is accomplished by splitting each filter and connecting the individual sections to a reversal switch. By selective programming of a plurality of filters, a particular frequency will be selected and passed through an array of such filters.

27 Claims, 20 Drawing Figures

SURFACE WAVE TRANSVERSAL FREQUENCY FILTER

This invention relates to transversal filters and more particularly to an elastic wave or surface wave transversal filter arranged to pass a selected frequency band.

Recently, studies have been completed and investigations conducted to show that bulk acoustic waves propagating in solids have application as delay lines in communication systems, radar systems and data processing systems. Now, effort is being expended in studying the application of surface waves in various device configurations including surface wave transducers, delay lines, decoders, filters and surface wave amplifiers. Advances, such as improved compound semiconductor materials, heteromaterial systems, integrated circuits and piezoresistance phenomena, combined with surface wave phenomena, has lead to many interesting and useful devices.

The theory of elastic waves propagation at the surface of a solid has not to date been thoroughly developed, primarily because of the complexity of the surface wave phenomena. Several types of elastic waves traveling along the surface of the solid have, however, been identified; these include Rayleigh waves, Love waves, and guided waves. Of these several types of elastic waves, only the Rayleigh wave will be considered, however, the invention is applicable to any transversal filtering technique using elastic waves or other waves. A Rayleigh wave is a purely surface wave traveling parallel to a stress-free, plane boundary of an infinite, isotropic, elastic solid. Such waves can be thought of as "clinging" to a region near a free surface and travel along parallel to the surface but damping out exponentially in a direction transverse to the free surface. Thus, most of the energy of the Rayleigh wave is contained within a wavelength of the surface; therefore, the designation as a surface wave is apt.

In accordance with one application of the present invention, a desired frequency out of a comb of frequency spikes generated by a low frequency source may be filtered out using surface wave propagation techniques. There are many purposes, for example, the local oscillator of a multi-channel receiver with a fixed channel spacing, in which it is required to filter out a desired frequency. In such applications, the filter regions of interest are a series of periodically spaced, deep notches. There are various known ways of satisfying such a requirement, such as voltage controlled oscillators phase locked to a reference oscillator. Such oscillators, however, are expensive and difficult to design.

In addition to local oscillators, for applications requiring the selection of desired frequency out of a comb of frequencies generated by a source, the frequency filter of the present invention finds application as an RF tuning filter in a receiver front end to replace present LC filters. This eliminates the need for a number of large reactive elements employed in such sections. Other receiver applications of the present filter include a tunable band pass filter for a tuned radio frequency receiver in which no IF section is required. Several other representative areas in which application may be found are TV receivers, commerical and military aircraft receivers, countermeasure receivers, radar receivers, and transmitters for all the above. Further, the present filter may also find application in frequency synthesizers and general purpose multi-channel receivers.

In accordance with one embodiment of the invention, a surface wave frequency filter includes a piezoelectric substrate on which is formed a first array of substantially parallel spaced interdigital electrodes defined on the substrate such that the overlap length of the electrodes varies in accordance with a weighting function, such as approximately sin $x/x$. Such a filter may include at least one additional array of substantially parallel and equally spaced interdigital electrodes defined on said substrate with each array spaced a predetermined distance from the first, and wherein the overlap length of the electrodes varies in accordance with a weighting function, and the electrodes of each additional array have a length less than the corresponding electrode of the first array. The propagated surface wave or elastic wave is detected by a pickoff means defined on the substrate which provides output terminals for the filter.

By arranging two of such filters on a substrate so that the first array of each is adjacent and by connecting each such filter to a phase reversing switch, a displacement of the band pass and band stop regions will result. The switch reverses the phase of the applied input signal to the adjacent filter sections thereby producing a reversal in the spaced relationship between the band pass and band stop regions of the output signal.

By interconnecting several of such elastic wave filters, as described above, in a preselected pattern, a particular frequency band out of a group of many frequencies may be selected. In a selection of a particular band, a first filter transducer converts an input signal into an elastic wave that propagates at the substrate surface such that an initial selection of a band of frequencies is made and this selective band travels sequentially through the pattern of a subsequent filter transducer. When the traveling wave reaches the second transducer, a further frequency band selection is made and the traveling waves are converted into a time varying signal. This time varying signal then passes through any number of additional filter sections arranged on a substrate until the desired frequency band selection has been made.

Briefly in accordance with another embodiment of the present invention, at least three sets of electrodes are defined in an array upon a piezoelectric substrate. The sets are deposited in an interleaved pattern to form an interdigitated transducer having three electrodes per acoustic wavelength at the desired filter center frequency. The sets of electrodes in the array are simultaneously driven with voltages of different phase such that components of the acoustic wave generated by the voltages add constructively in one direction of propagation of the acoustic wave but substantially cancel each other in the opposite direction of propagation. When the three sets of electrodes in an array are utilized, thus defining on the substrate three electrodes per acoustic wavelength, the phase of the driving voltages applied to the electrode of one set differs from the phase of the voltage applied to adjacent electrode which are respectfully members of different sets, by 120°. Means for providing the required 120° phase shift to the input signal for driving the respective sets of electrodes of each array are also provided.

Such a filter may also include at least one additional array having three sets of electrodes defined on the substrate with each array spaced a predetermined distance from the first. For each array of such a filter, the overlap length of the electrode varies in accordance with a weighting function. The propagated surface wave or elastic wave is detected by a pickoff means defined on the substrate and providing output terminals for the filter.

By arranging two of such three electrode set filters on a substrate so that the first array of each is adjacent and by connecting each such filter to a phase changing switch, a displacement of the band pass and band stop regions will result. The switch changes the phase displacement between the sets of electrodes in each array of the second filter from those of the first filter, thereby producing a shift in the phase relationship between the band pass and band stop regions of the output signal.

A more complete understanding of the invention and its advantages will be apparent from the specification and claims and from the accompanying drawings illustrative of the invention.

Referring to the drawings:

FIG. 1 is a pictorial of a basic filter section for passing a given band of frequencies at a desired center frequency with controlled band pass and band stop regions;

FIGS. 2*a*, 2*b* and 2*c* are plan views of the first, third and fifth time harmonic related taps of the basic filter in accordance with the present invention;

FIGS. 3*a*, 3*b* and 3*c* are a series of curves showing the various functions that determine the configuration of each tap of the filter of FIG. 1;

FIG. 4*a* illustrates the band pass and band stop curve for the fundamental tap of FIG. 2*a* and FIG. 4*b* illustrates the band pass and band stop regions for the composite tap filter;

FIG. 5 is a pictorial of a two-secion, six-tap filter coupled to a coding switch for producing phase shiftable band pass and band stop regions;

FIG. 6*a* is a curve showing the band pass and band stop regions of the filter of FIG. 5 with both sections connected directly to an applied signal, and FIG. 6*b* is a graph showing the band pass and band stop regions where one section of the filter of FIG. 5 is connected to produce a reversal in the time displacement between the band pass and band stop regions;

Figure 13:
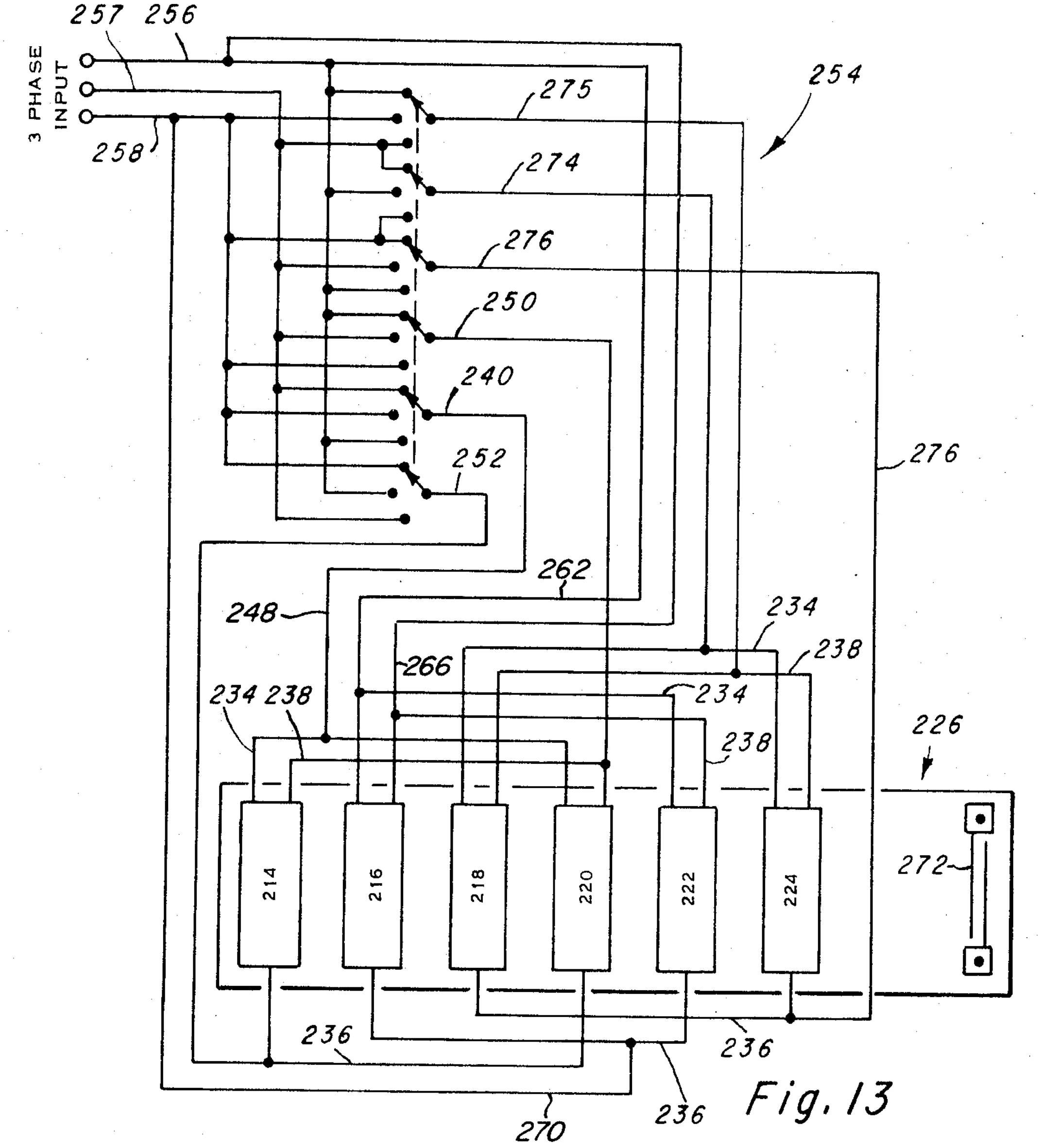
Figures 12, 14:
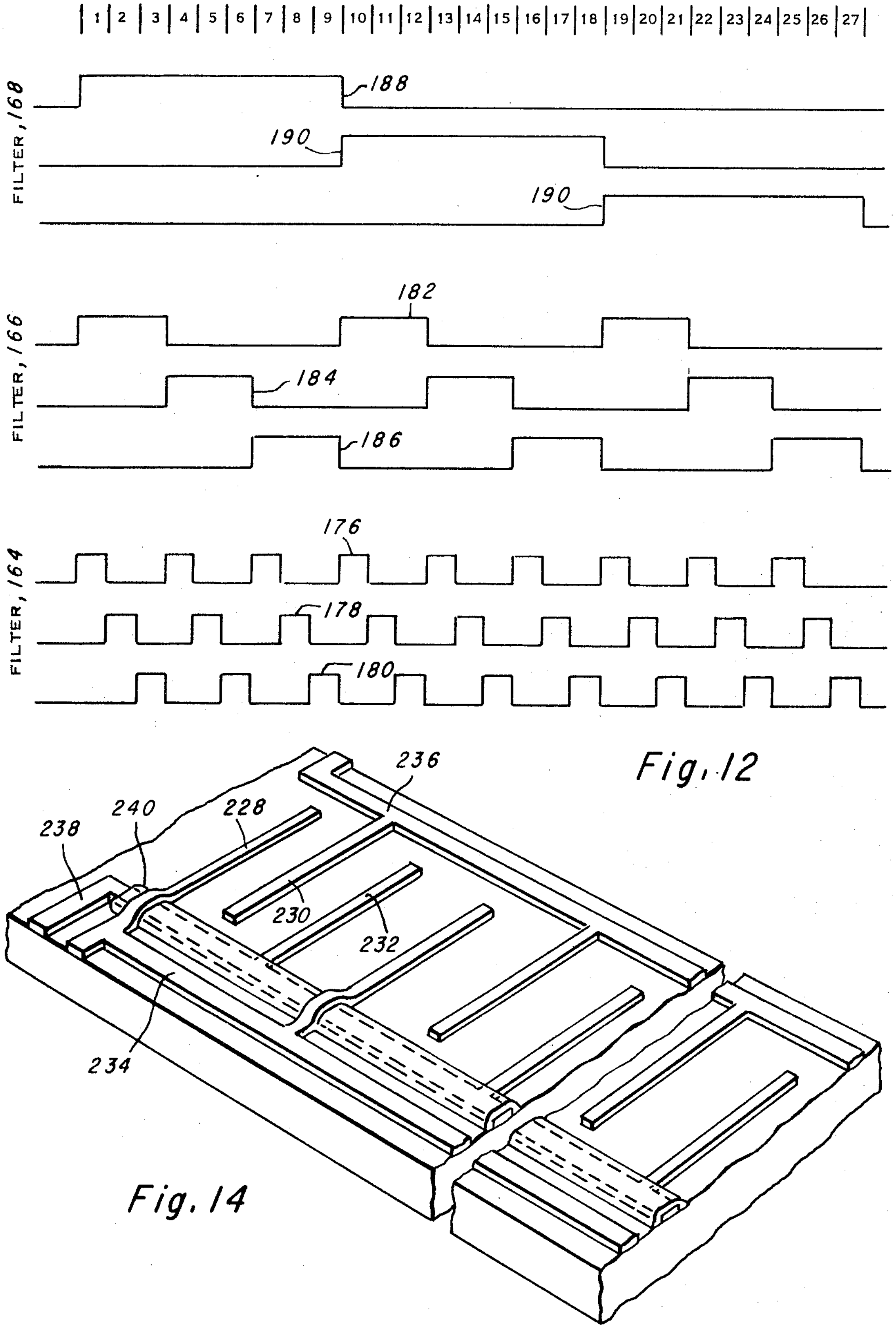
FIG. 12 is a series of curves for the filters of FIG. 11 for each of the various states into which the filters may be switched.

FIG. 13 is a pictorial of a six-tap filter with each tap including three sets of electrodes, the taps are divided into three groups and two of these are coupled to a coding switch for producing phase shiftable band pass and band stop regions; and FIG. 14 is a greatly enlarged, partially cutaway, pictorial view of a portion of a filter tap array in accordance with still another embodiment of the present invention.

Although the transversal frequency filter of the present invention finds application with both multi-phase and single phase applied voltages, application to the single phase operation will be emphasized. It should be understood, however, that the techniques described with regard to the single phase filter are applicable to the multi-phase filters of which a three phase filter is also to be described.

Figure 1:
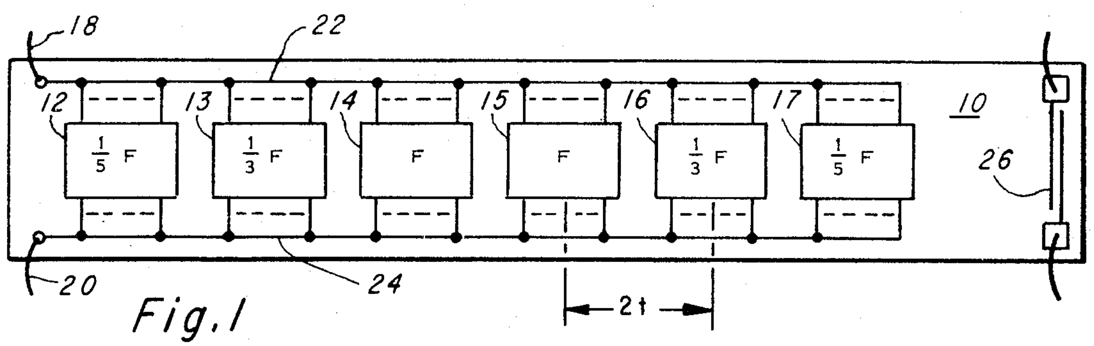

Referring to FIG. 1, there is shown a six-tap filter formed in a single crystalline piezoelectric substrate 10. The substrate may comprise, for example, convenient lengths of lithium niobate, quartz, zinc oxide, cadmium sulfide, or other piezoelectric materials. A plurality of filter taps 12–17 are defined on the surface of the substrate 10. Each of the taps 12–17 are connected to an input signal applied to lines 18 and 20 by means of conductor bars 22 and 24. An elastic wave generated at the surface of the substrate 10 by the filter taps 12–17 is detected by an output transducer 26 that may take the form of interdigitated electrodes.

An input signal applied to the input lines 18 and 20 and connected to the filter comprising taps 12–17 should generate an output at the transducer 26. Preferably, the filter of FIG. 1 will pass a selected center frequency and a given band centered on this frequency. Further, the filter should have well defined band pass and band stop regions.

Figure 2A:
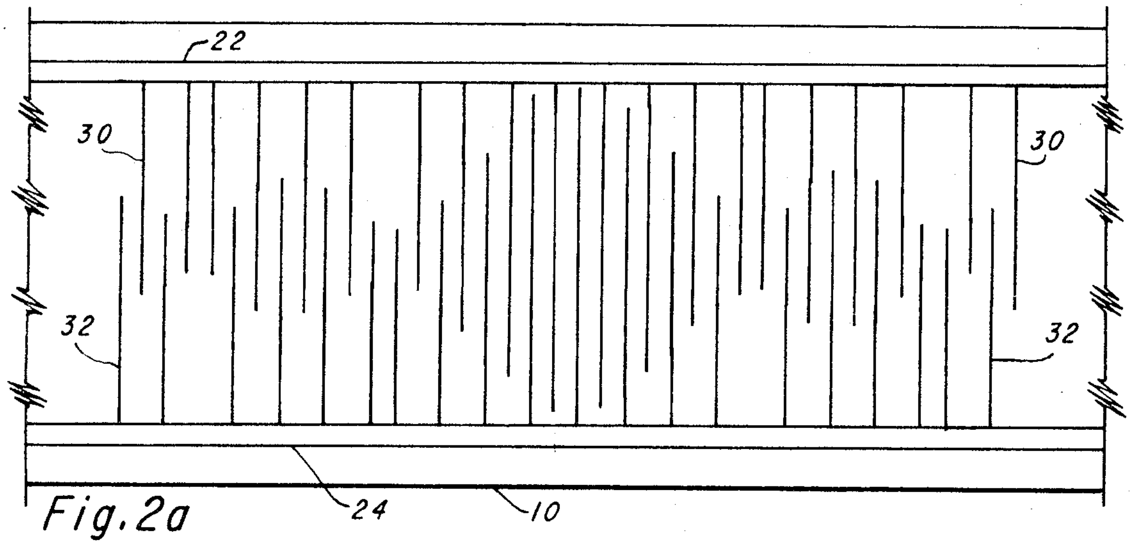

To generate the desired filtering function each of the taps 12–17 is designed in accordance with the three functions of FIG. 2. Referring to FIG. 2*a*, there is shown an expanded view of the filter taps 14 and 15 having electrode spacings related to the fundamental in the time domain of a band pass - band stop periodicity in the frequency domain. A first plurality of electrodes 30 are commonly connected to the conductor bar 22. Adjacent electrodes 30 are spaced apart by one wavelength of the center frequency of the bandwidth region passed by the filter. A second plurality of electrodes 32 are commonly connected to the conductive bar 24, the second plurality of electrodes 32 being interlaced with the first plurality of electrodes 30 to form an interdigitated pattern. Adjacent electrodes 30 and 32 are spaced apart by one-half of a wavelength of the center frequency of the passed bandwidth.

The electrodes 30 and 32 may comprise aluminum, gold or other appropriate metals and may be formed on the substrate 10 by conventional deposition masking and etching metalization techniques, or other techniques for defining a metal pattern on a surface. Conventionally, a layer of metal is formed on the surface of the substrate 10 and a photoresist layer is formed to overlie this metal layer. Selected areas of the photoresist layer are exposed through a mask defining the interdigitated pattern of electrodes 30 and 32 connected to the conductive bars 22 and 24. This mask may be formed by techniques thoroughly described in the literature. A metal underlying the exposed area is selectively etched away using an etchant of presently known composition and reaction to thereby form the required electrode pattern.

Figure 2B:
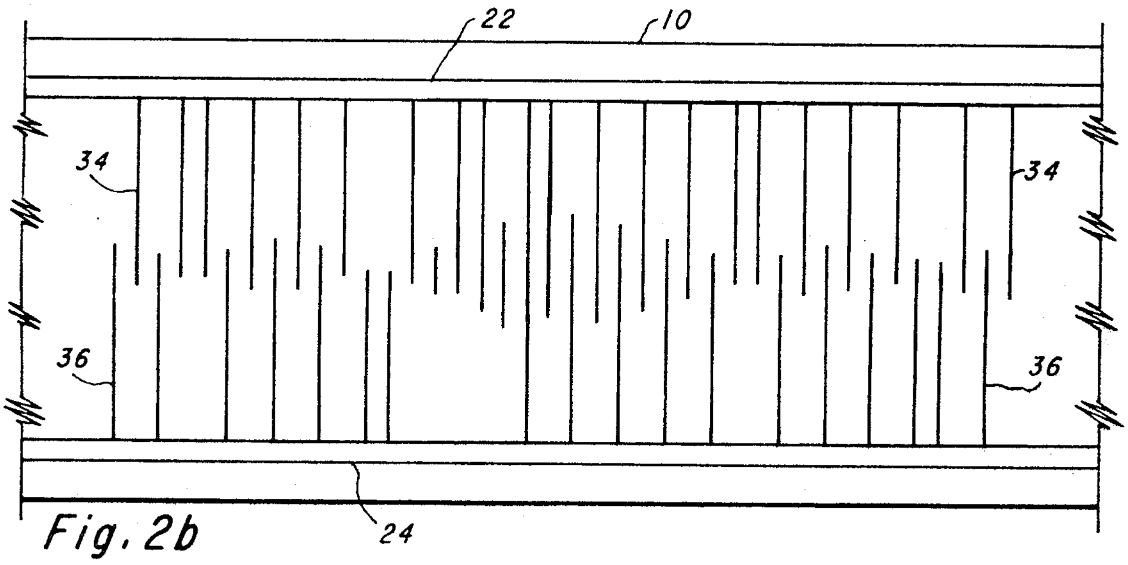

Referring to FIG. 2*b*, there is shown an expanded view of the taps 13 and 16 whose placement on the substrate correspond to the third time harmonic of the frequency periodicity associated with the filter. Filter taps 13 and 16 are similar to filter taps 14 and 15 and comprise a first plurality of electrodes 34 commonly connected to the conductive bar 22. Adjacent electrodes 34 are spaced apart by one wavelength of the center frequency as were the electrodes 30. Filter taps 13 and 16 also include a second plurality of electrodes 36 commonly connected to the conductive bar 24, the second plurality of electrodes being interlaced with the first plurality of electrodes 34 to form an interdigitated pattern similar to the taps 14 and 15. Adjacent electrodes 34 and 36 are spaced apart by one-half of a wavelength at the center frequency as were the electrodes 30 and 32. Note, however, that the overlap length of adjacent electrodes 34 and 36 is not as great as the overlap length of adjacent electrodes 30 and 32; this will be explained.

Figure 2C:
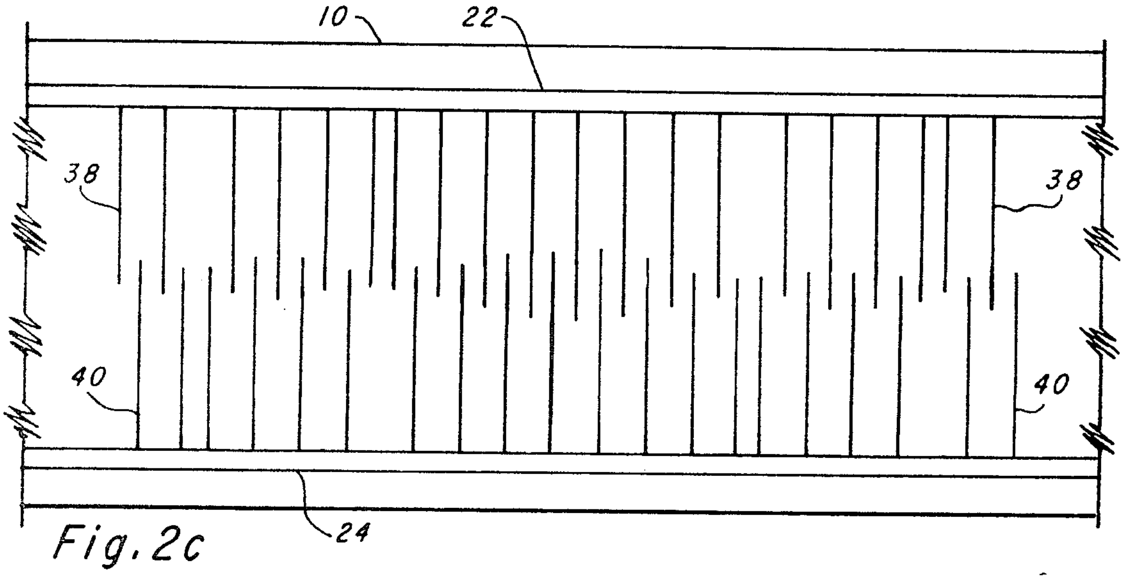

Referring to FIG. 2*c*, there is shown an expanded view of the filter taps 12 and 17 whose placement on the substrate correspond to the fifth time harmonic of the frequency periodicity associated with the filter. Like the other four taps of the filter, taps 12 and 17 include a first plurality of electrodes 38 commonly connected to the conductive bar 22 and a second plurality of electrodes 40 connected to the conductive bar 24. The second plurality of electrodes 40 being interlaced with the first plurality of electrodes 38 to form an interdigitated pattern. Note again, however, that the overlap length of the electrodes 38 and 40 is not as great as either the overlap length of the electrodes 34 and 36 or the overlap length of the electrodes 30 and 32. Adjacent electrodes 38 and 40 of the taps 12 and 17 are spaced apart by one-half of a wavelength at the center frequency.

Although the adjacent electrodes of the taps 12–17 have been described as equally spaced, to produce a given filter function the spacing between electrodes may vary. That is, instead of the electrodes being equally spaced a particular pattern of electrode spacing may be provided to give a selected filter function. To simplify the description of the invention, however, only equally spaced electrodes will be described.

In order to flatten the band pass over which truly periodic frequency response occurs, the interlace pattern of the overlapping electrodes of each of the taps 12–17 varies approximately in accordance with the function sin $x/x$. Other weighting functions may also be used, for example, Gaussian-shaped filter taps, in which the overlap length of the interdigital electrodes varies in a Gaussian manner, may be required to produce a given filter function.

From a close examination of the filter taps of FIGS. 2*a*, 2*b*, and 2*c*, it will be noted that the overlap patterns vary approximately in accordance with the function sin $x/x$. The center two electrodes 30 of FIG. 2*a* and the adjacent electrodes 32 overlap by a distance established as unity. That is, the overlap length of the center two pairs of electrodes 30 and 32 overlaps to produce the desired amplitude for the generated elastic wave. Electrodes 30 and 32 extending from the center pair vary in overlap length in a manner represented by the function sin $x/x$. The center two electrodes 34 of FIG. 2*b* and the adjacent two electrodes 36 overlap a distance equal to one-third that of the center electrodes of the tap shown in FIG. 2*a*. This corresponds to the third time harmonic of the frequency periodicity associated with the filter and produces the elastic wave associated therewith. Electrodes extending from the center pair of electrodes 34 and 36 vary in overlap length to produce a pattern varying in accordance with the function sin $x/x$. In FIG. 2*c*, the overlap length of the center two electrodes 38 and the adjacent electrodes 40 equals one-fifth the overlap of the electrodes 30 and 32. This corresponds to the fifth time harmonic of the frequency periodicity associated with the filter and produces an elastic wave in the substrate 10 corresponding with this harmonic. Note that the electrodes of this array are connected to the opposite pad compared to the corresponding electrode in FIGS. 2d and 2b. This provides a sign change necessary for this tap to realize an effectual negative amplitude of $-1/5$. Electrodes extending from the center pairs 38 and 40 overlap to produce a pattern that varies in accordance with the function sin $x/x$. Since the relationship of the overlap pattern of each of the filter taps of FIGS. 2*a*, 2*b* and 2*c* varies in accordance with the function sin $x/x$, the overlap length of adjacent electrodes in the taps 12 and 13 or 16 and 17 have a fixed ratio with respect to the overlap length of corresponding electrodes of the taps shown in FIG. 2*a*. That is, any corresponding pair of electrodes of the tap of FIG. 2*c* overlaps a distance equal to one-fifth the overlap of the corresponding pair of electrodes of the filter tap of FIG. 2*a*. Similarly, any pair of electrodes 34 and 36 of the filter tap of FIG. 2*b* overlap a distance equal to one-third the overlap of a corresponding pair in the filter tap of FIG. 2*a*.

Figures 3A, 3B, 3C:
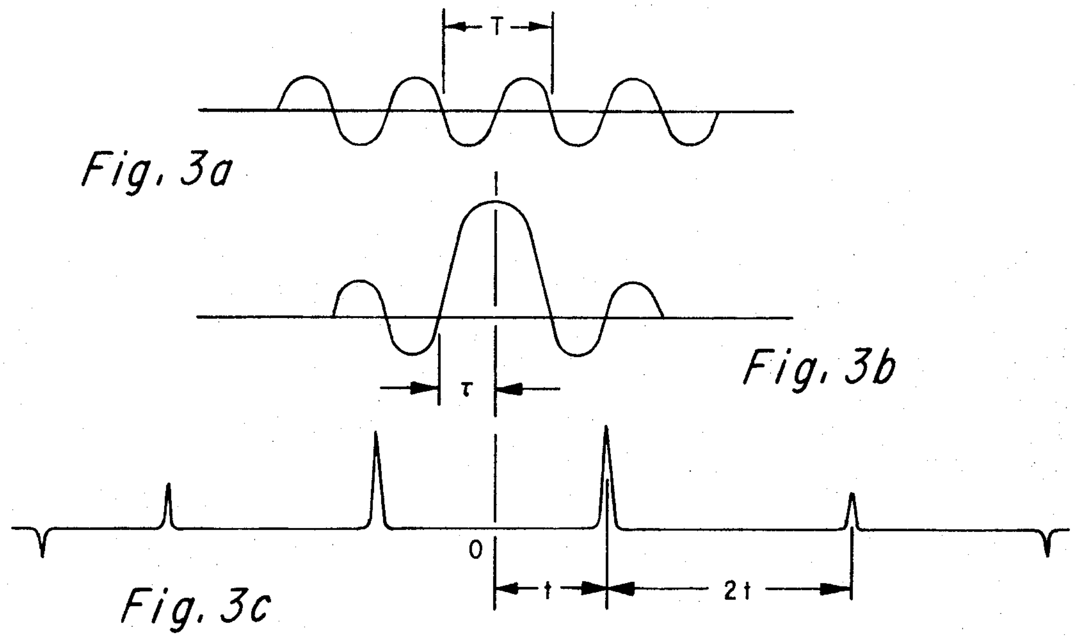

As mentioned previously, the filter taps are designed to provide a filter having a definite effective filtering bandwidth centered about a desired frequency. The three functions that must be met to achieve this desired result are illustrated in FIG. 3 wherein the curve of FIG. 3*a* is a periodic function having a period T. The period of this function establishes the center frequency passed by the filter. The curve of FIG. 3*b* is the function sin $x/x$ and it is the outline of this function that establishes the bandwidth of the filter. The degree spaced between the center reference axis through the function sin $x/x$ and the first crossing of the zero axis of this curve establishes the bandwidth of desired frequencies; this is defined by the letter $\tau$. In FIG. 3*c*, there is illustrated a periodically occurring impulse signal of varying magnitude spaced apart as illustrated with the spacing $2t$ determining the spacing between adjacent taps of the filter sections 12–17. That is, the center-to-center distance between adjacent taps is equal to $2t$, the space between pulses of FIG. 3*c*. The amplitude of the pulses vary according to which time harmonic the pulse corresponds with. Usually the center-to-center tap spacing will be the same for all taps of a given filter.

To achieve a particular filter design, the product of the periodic function of FIG. 3*a* and the weighting function of FIG. 3*b* is taken. This produces a square wave frequency response centered about the fundamental frequency of a desired filter. By a convolution of this product and the periodically occurring impulse function of FIG. 3*c*, there results a function describing the configuration of each tap of a filter section.

Figure 4A:
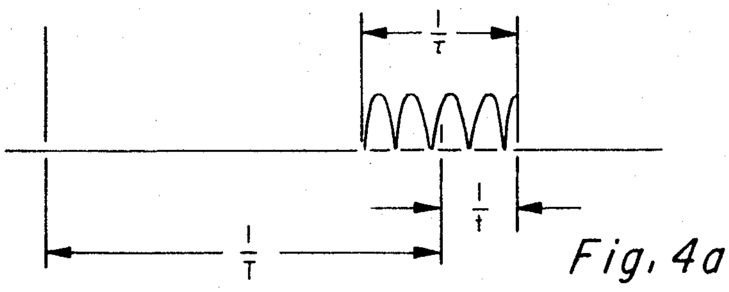
Figure 4B:
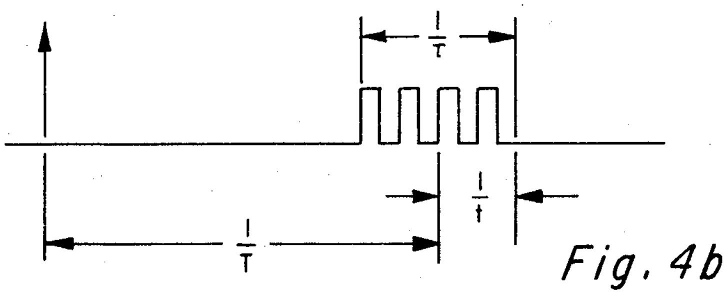

Referring to FIGS. 4*a* and 4*b*, there is illustrated the frequency response passed by the filter of FIG. 1 as detected by the output transducer 26. FIG. 4a illustrates the band pass characteristics resulting from the use of only the center taps 14 and 15. The use of such taps produces a rounded band pass characteristic. To provide clearly defined band pass and band stop regions, the taps 12, 13, 16 and 17 are added to the filter. This is analogous to generating a square wave by a combining of the fundamental and third and fifth harmonic of a sine wave. Referring again to FIG. 4b, the center frequency around which the band pass appears is equal to the frequency of the curve of FIG. 3a. That is, the effective filtering band pass of the filter at the transducer 26 will be centered about the frequency 1/T in the frequency domain. The overall bandwidth is equal to $1/\tau$ which equals the distance between the center reference of the curve of FIG. 3b and the first zero crossing. The period of the band pass and band stop regions is equal to $1/t$ which corresponds to the spacing of the filter taps 12–17.

Figure 5:
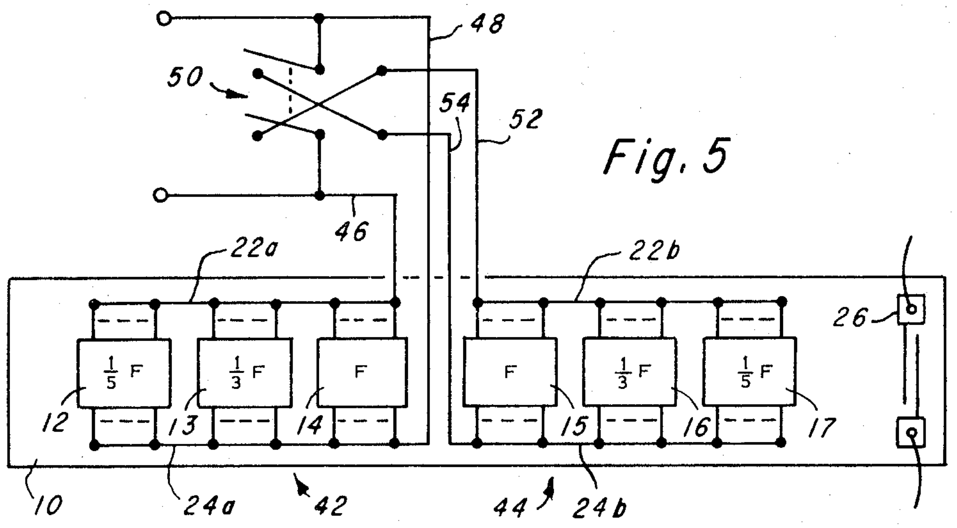

To provide a reversal of the band stop and band pass regions of the output signal, the filter of FIG. 1 is divided into two sections. Referring to FIG. 5, thre is shown a filter wherein the section 42 comprising taps 12, 13 and 14 are formed independent of section 44 comprising taps 15, 16 and 17 on the substrate 10. Adjacent electrodes 30, 34 and 38 of taps 14, 13 and 12, respectively, are commonly connected to a conductive bar 22a and adjacent electrodes 32, 36 and 40 are commonly connected to a conductive bar 24a. The conductive bar 22a is connected to an input line 46 and the conductive bar 24a is connected to an input line 48. Adjacent electrodes 32, 36 and 40 of filter sections 15, 16 and 17, respectively are connected to a conductive bar 22b and adjacent electrodes 32, 36 and 40 are connected to a conductive bar 24b. Conductive 22b is connected to one of two output terminals of a two position switch 50 through an input line 52 and the conductive bar 24b is connected to the switch through an input line 54.

Although the two position switch 50 is illustrated as a double-pole double-throw switch, existing diode switches are preferable. The switch 50 has been illustrated in a manner shown for simplicity in describing the invention. Input terminals of this switch are connected to the input lines 46 and 48.

The filter taps and conductive bars of the filer of FIG. 5 may be formed on the substrate 10 in the manner previously described with respect to similar components illustrated in FIG. 1. That is, conventional metalizing, masking and etching techniques may be employed. At the output end of the substrate 10 is formed the output transducer 26.

Figure 6A:
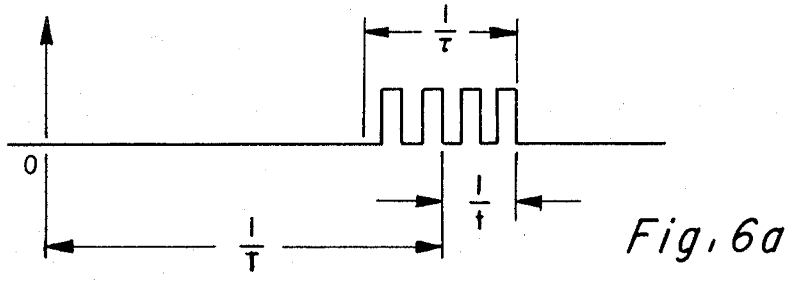

With the switch 50 in the position shown, an input signal applied to the lines 46 and 48 is connected to the taps of section 42 in phase with the taps of section 44. In this position, then, the filter of FIG. 5 is identical in operation to that of FIG. 1. Referring to FIG. 6a, the frequency response of an output at the transducer 26 will appear as illustrated. The center frequency of the signal is related to the spacing of the electrodes of the taps 12–17, the band pass and band stop regions of the output signal are related to the overlapping pattern of the taps and the periodicity of the band pass and band stop regions is related to the tap center-to-center spacing.

Figure 6B:
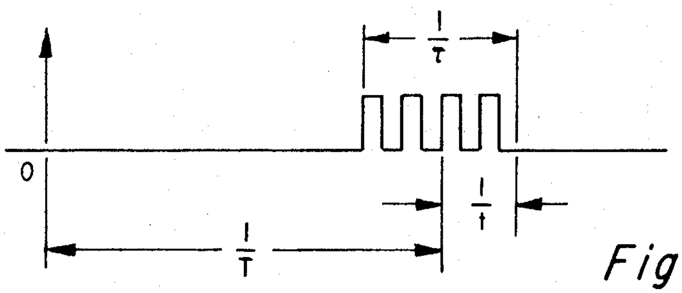

By changing the movable contacts of the switch 50 from the position illustrated to its second position there will be a 180° phase displacement between an input signal applied to the taps 12–14 and a signal applied to the taps 15–17 that results in an interchange in the band pass and band stop regions of the filter. Each of the taps contributes to the composite elastic wave generated in the substrate 10; however, this elastic wave contribution from taps 15, 16 and 17 now produces a contribution to the output signal at the transducer 26 that is displaced from a signal with the switch 50 in the first position. Referring to FIG. 6b, there is illustrated the frequency response of a signal as appearing at the transducer 26 with the switch 50 in its second position. By a comparison of the curve of FIG. 6b with that of FIG. 6a, it will be seen that a reversal of the band pass and band stop regions has taken place. Note, that the center frequency remains the same as does the width of the overall band pass. Similarly, the periodicity of the region of the curve of 6b is identical to that of FIG. 6a. Thus, by separating the filter into two sections and providing a phase reversal switch for the input signal, a selectable output is possible. The selection, in effect, interchanges the band pass and band stop regions of the filter.

Figure 7:
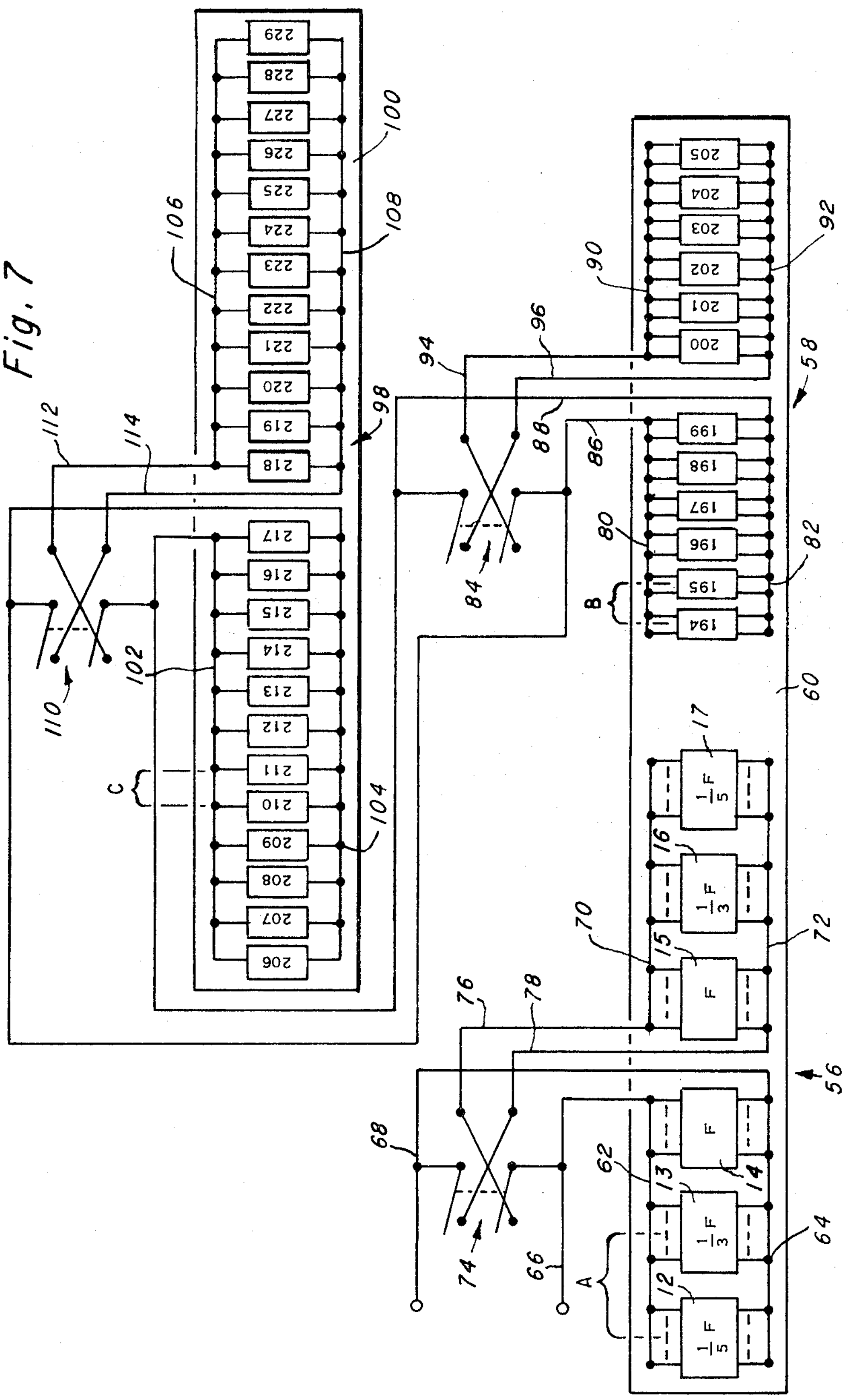
FIG. 7 is a pictorial view of a filter system having two filters, one as the input transducer and the other as an output transducer, on one substrate connected to a filter on a second substrate, each filter selectable for desired frequency selection.

To provide additional selection and interchangeability for the band pass and band stop regions, the filter of FIG. 1 is provided in a filtering system as shown in FIG. 7. Two filters 56 and 58 are formed on a single crystalline piezoelectric substrate 60. The filter 56 includes two sections with one section comprising taps 12, 13 and 14 and the second section comprising taps 15, 16 and 17. Adjacent electrodes of the taps 12–14 are alternately connected to conductive bars 62 and 64. Conductive bar 62 is connected to an input line 66 and conductive bar 64 is connected to an input line 68. Taps 15, 16 and 17 have adjacent electrodes alternately connected to conductive bars 70 and 72. Conductive bar 70 is connected to a two position switch 74 through an input line 76 and conductive bar 72 is connected to the two position switch through an input line 78.

Filter 56 with the associated switch 74 is similar to the filter of FIG. 5. With the switch 74 in the position illustrated, an input signal connected to the lines 66 and 68 will be applied to the sections of the filter 56 in phase.

A surface wave generated in a substrate 60 by an input signal applied to the filter 56 propagates to the filter 58. Filter 58 includes two sections with one section comprising taps 194–199 and the second section comprising taps 200–205. Adjacent electrodes of the taps 194–199 are alternately connected to conductive bars 80 and 82. Conductive bar 80 is connected to a two position switch 84 through an input line 86 and conductive bar 82 is connected to the two position switch through an input line 88. Taps 200–205 have adjacent electrodes alterately connected to conductive bars 90 and 92. Conductive bar 90 is connected to a line 94 and conductive bar 92 is connected to a line 96. The two position switch 84 is also connected to the lines 94 and 96.

The taps 194–205 of the filter 58 may have the same general configuration as the taps 12–17 of filter 56; however, each of the filters will be designed to have a distinct band pass and band stop configuration. Each of the taps 194–205 will be configured by a particular weighting function, such as approximately sin $x/x$. By decreasing spacing of the taps in the filter 58 from the filter 56, the number of band pass and band stop regions would be less for the filter 58 than for the filter 56. Due to the decreased spacing between the taps of the filter 58 from the filter 56, the approximation to the weighting function sin *x*/*x* of FIG. 3b may be somewhat degraded from the filter 56. This does not, however, adversely affect the overall filter performance.

A surface wave propagating through the substrate 60 from the filter 56 will be further filtered by the taps of the filter 58. Filter 58 functions as a transducer to convert the surface wave into an electrical signal on lines 94 and 96. With the two position switch 84 in the position shown, the filtering characteristic from each of the sections of the filter 58 will be additive in an "in phase" relationship. With the switch 84 in the second position, the filter characteristic from the sections of the filter 58 will be combined with a reversal in phase. This produces an output on the lines 94 and 96 having band pass and band stop regions reversed from the output with the switch 84 in the position shown. This is similar to the curves of FIGS. 6a and 6b as referenced to FIG. 5.

An output on lines 94 and 96 is further applied to filter 98 formed on a crystalline piezoelectric substrate 100. Filter 98 comprises two sections with one section including taps 206–217 and the second section including taps 218–229. Taps 206–217 have adjacent electrodes alternately connected to conductive bars 102 and 104. Conductive bar 102 is connected to input line 96 and the conductive bar 104 is connected to the input line 94. Filter taps 218–229 include electrodes alternately connected to conductive bars 106 and 108. Conductive bar 106 is connected to a two position switch 110 through an input line 112 and conductive bar 108 is connected to the two position switch through an input line 114. A surface wave generated by the filter 98 travels through the substrate 100 to an output transducer 116.

The taps of the filter 98 are similar to those of the filters 56 and 58 in that the weighting function may approximate the function sin *x*/*x*. The spacing between adjacent electrodes for each of the filters 56, 58 and 98 may be the same and equal to one-half of a wavelength of the center frequency of the device. Although the weighting pattern, i.e., (sin *x*/*x* ) of each of the three filters is similar, the spread to the electrodes of the filter 98 will extend only part way from the center line to the zero-axis crossover. The difference between each of the filters 56, 58 and 98 is that each has a different number of band pass and band stop regions with correspondingly different widths.

The configuration of filter 98 on the substrate 100 and the output transducer 116 is similar to the arrangement of FIG. 5 with the difference in the number of taps. With the two position switch 110 in a position shown, a signal on the input lines 94 and 96 is applied to both sections of the filter 98 in an "in phase" relationship. When the switch 110 is in a second position, a signal on the input lines 94 and 96 is applied to the sections of the filter 98 with a 180° phase reversal between sections.

Figure 8:
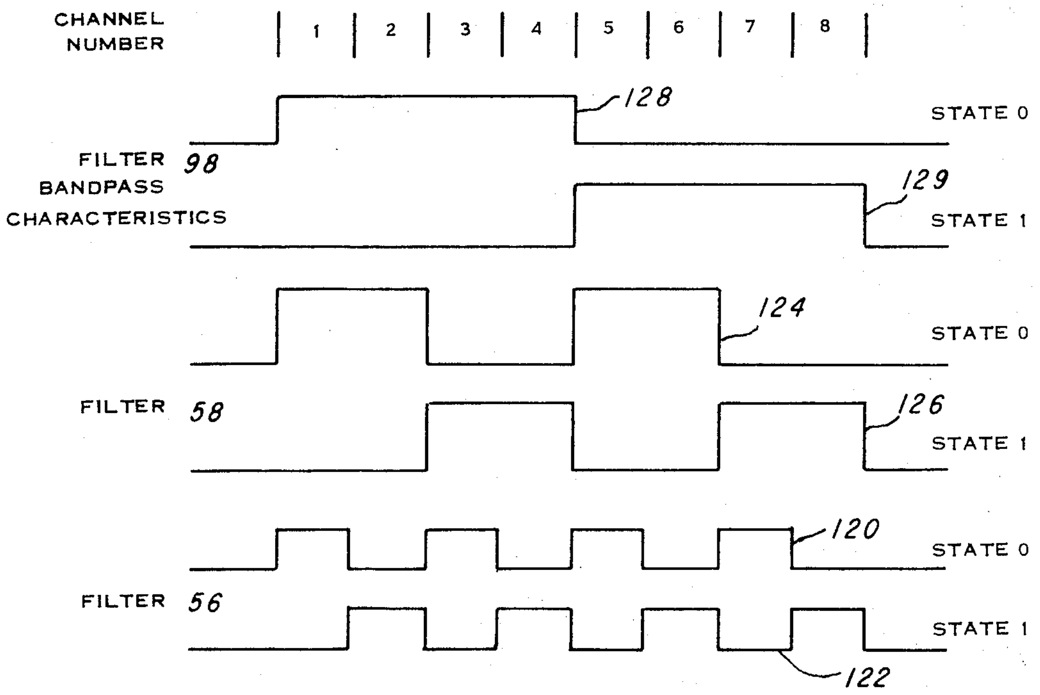
FIG. 8 is a series of curves showing the band pass and band stop regions of the filters of FIG. 7 for each of the two selectable states.

Referring to FIG. 8, there is shown the band pass and band stop regions for each of the filters 56, 58 and 98 for both positions of the respective two position switches. Since each of the switches has two stable positions, and since in the preferred configuration they are solid state switching devices, reference will be made to the condition of each of the switches as state ZERO and state ONE. Curves 120 and 122 illustrate the band pass characteristics of the filter 56 with curve 120 representing the filter characteristic when the switch 74 is in the position shown, that is, in state ZERO, and curve 122 representing the filter characteristic when the switch 74 is in the second position, that is, in state ONE. Curves 124 and 126 represent the band pass characteristic of the filter 58 with the curve 124 representing the band pass characteristics for the switch 84 in state ZERO (as illustrated) and curve 126 with the switch in state ONE. Curves 128 and 129 represent the band pass characteristics of the filter 98 with the curve 128 representing the filter characteristic when the switch 110 is in state ZERO (as illustrated) and curve 129 illustrating the filter characteristic with the switch in state ONE.

Figure 9:
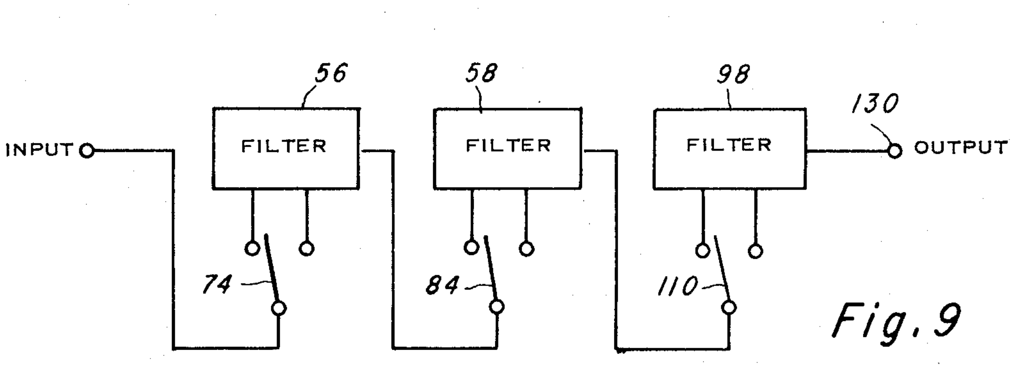
FIG. 9 is a block diagram representation of the system of FIG. 7 showing the three filters connected in cascade with each filter selectable between one of two states.

Referring to FIG. 9, there is shown a block diagram of the filters 56, 58 and 98 in a cascade arrangement with the respective switches 74, 84 and 110, each in state ZERO. By properly setting the switches 74, 84 and 110 one of eight channels may be selected as the frequency response of the output at the transducer 116 (represented in FIG. 9 by the terminal 130). Assume that it is desired to pass one of eight channels between a lower frequency and an upper frequency, the bandwidth between this lower and upper frequency is equal to $1/\tau$ as determined by the outline of the overlapping pattern of the taps of each filter (reference FIG. 3*b* for a definition of $\tau$ ). Thus, for each of the filters 56, 58 and 98 the lower and upper frequency limit will be the same. The number of band pass and band stop regions will vary between filter 56, 58 and 98 as shown in FIG. 8. To select one of eight channels between a lower limit and an upper limit frequency, the switches 74, 84 and 110 are selectively positioned. Referring to Table 1, the required switch position to pass a given channel is shown. Thus, by selective positioning the switches 74, 84 and 110 one of eight frequency channels may be selected from a band extending from a lower frequency to an upper frequency.

TABLE 1

| Channel No. | Switch Positions 74 | 84 | 110 |
|---|---|---|---|
| 1 | 0 | 0 | 0 |
| 2 | 0 | 0 | 1 |
| 3 | 0 | 1 | 0 |
| 4 | 0 | 1 | 1 |
| 5 | 1 | 0 | 0 |
| 6 | 1 | 0 | 1 |
| 7 | 1 | 1 | 0 |
| 8 | 1 | 1 | 1 |

Figure 10:
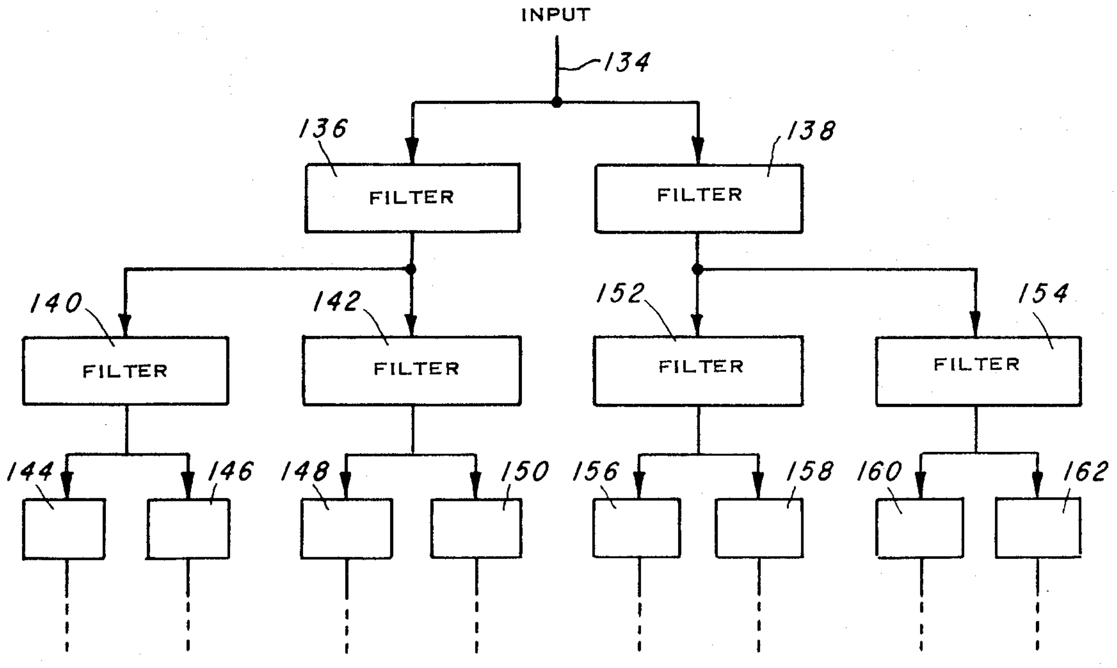
FIG. 10 is a block diagram of a multi-channel filter in the form of a tree having a number of desired output simultaneously.

For some applications, such as a multi-channel receiver, rather than use cascaded filters as shown in FIG. 7, filters of the type described are connected in the form of a "tree" such as shown in FIG. 10. Each of the blocks of FIG. 10 represent a filter of the type illustrated in FIG. 5 designed to have a particular band pass characteristic with the number of band pass and band stop regions within a given bandwidth determined by the number of taps in a particular filter. For fewer regions a greater number of taps are required.

An input signal on a line 134 is applied to filters 136 and 138. Each of these filters is designed to have a band pass characteristic between a lower frequency and an upper frequency with only a relatively few band pass and band stop regions. An output from the filter 136 is applied to filters 140 and 142; these filters have a band pass characteristic between the same lower and upper frequencies as the filter 136 but have a different number of band pass and band stop regions as controlled by the number of taps in a filter and their spacing. An output from the filter 140 is supplied to filters 144 and 146; these provide a different number of band pass and band stop regions as either the filters 136 or 140 but within the same frequency range. An output from the filter 142 is applied to filters 148 and 150; these have a different number of band pass and band stop regions than either the filters 136 or 142. It should be noted, that filters at each of the various levels are identical except for a phase change.

An output of the filter 138 is applied to filters 152 and 154 on the same level as filters 140 and 142. An output from the filter 152 is applied to filters 156 and 158 and an output from the filter 154 is applied to filters 160 and 162. With the tree arrangement of FIG. 10, a greater number of independent outputs may be generated simultaneously from a given comb of frequencies using fewer filters than as cascaded. It should also be noted that each of the filters of the "tree" of FIG. 10 may have the same phase relationship or those in one-half may have a 180° phase displacement from the corresponding filter in the other half.

It should also be noted that each pair of filters with common inputs can be replaced with a single filter by using sum and difference connections from the two halves of the filter transducer to obtain two outputs as required.

Due to the flexibility for realizing many different impulse responses, a filter of the type shown in FIG. 5 may have more than two states by simply employing a multipole switch. In this modification, the two position switch for each of the filters is replaced by a three phase switch. The degree of phase shift between signals applied to the sections of a filter will then be determined by the switch position. By using multi-state filters, the number of filters required and the number of cascaded sections is reduced. For example, by using three filters each of which has three states, a selection of any one of 27 channels is possible.

Figure 11:
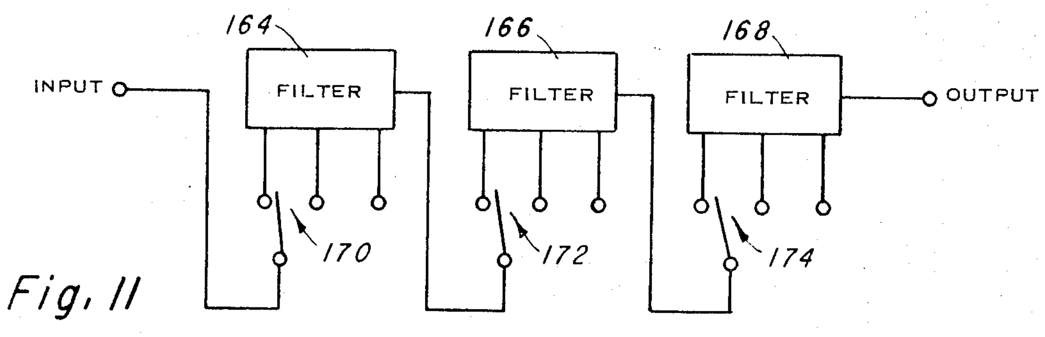
FIG. 11 is a block diagram of three filter sections connected in cascade with each filter selectable between one of three possible states.

Referring to FIG. 11, there is shown a block diagram of a three filter cascade arrangement wherein each of the three filters have three separate states. An input signal applied to the filter 164 produces an output that is applied to a filter 166 and an output from the filter 166 is applied to a filter 168. Each of the filters 164, 166 and 168 resembles the type shown in FIG. 5 with the two position switch replaced by a three position switch and the number of taps in filter 166 double that of filter 164 and the number of taps of filter 168 double that of filter 166, somewhat similar to the arrangement between filter 56, 58 and 98 of FIG. 7. Filter 164 includes a three position switch 170 for selecting one of three states for the filter. In position ZERO, the input signal applied to both sections of the filter is in phase. In position ONE a preset phase shift is applied to the input signal prior to being connected to the second section of the filter. In position TWO, another preset phase shift is introduced into one section of the filter. Filter 166 includes a three position switch 172 also providing three states for the filter. The phase shift between position ZERO and position ONE for the filter 166 will be the same as that between position ZERO and position ONE for the filter 164. Similarly, the phase shift between position ONE and position TWO for the filter 166 is identical with the phase shift between position ONE and position TWO of the filter 164. Filter 168 includes a three position switch 174. The phase shift between each of the three positions for the filter 168 is the same as that of the filters 164 and 166.

Referring to FIG. 12, there is shown a band pass characteristic for each of the filters of FIG. 11. Curve 176 is the characteristic for filter 164 when in position ZERO, curve 178 is a characteristic of filter 164 in position ONE and curve 180 is a characteristic of filter 164 in position TWO. Curve 182 is the characteristic of filter 166 in position ZERO, curve 184 is the characteristic of filter 166 in position ONE and curve 186 is the characteristic of filter 166 in position TWO. Curve 188 is the characteristic of filter 168 in position ZERO, curve 190 is the characteristic of filter 168 in position ONE and curve 192 is the characteristic of filter 168 in position TWO. The range of frequencies for each of these curves of FIG. 12 is the same, that is, the band pass and band stop regions extends from a lower frequency to an upper frequency.

By selectively arranging the state of each of the filters 164, 166 and 168 any one of 27 channels may be selected as the frequency response at the output of the filter 168. Table 2 shows the required position of the three position switches to select one of the given 27 channels. Thus, with the arrangement of FIG. 11 one channel of frequencies may be selected between a lower frequency limit and an upper frequency limit.

TABLE 2

| | Filter Switch | | |
|---|---|---|---|
| Channel Number | 170 | 172 | 174 |
| 1 | 0 | 0 | 0 |
| 2 | 0 | 0 | 1 |
| 3 | 0 | 0 | 2 |
| 4 | 0 | 1 | 0 |
| 5 | 0 | 1 | 1 |
| 6 | 0 | 1 | 2 |
| 0 | 0 | 0 | 0 |
| 0 | 0 | 0 | 0 |
| 0 | 0 | 0 | 0 |
| 25 | 2 | 2 | 0 |
| 26 | 2 | 2 | 1 |
| 27 | 2 | 2 | 2 |

Referring to FIG. 13, there is shown a three-phase transversal filter in accordance with the present invention including six taps 214 - 224. Each of the taps are formed on a substrate 226.

Referring to FIG. 14, there is shown an enlarged pictorial view of one of the taps for the three-phase filter of FIG. 13. Representative electrodes of each of three sets for each tap are shown generally at 228, 230 and 232. The sets of electrodes are interleaved such as described previously with one electrode from each set included in successive acoustic wavelengths. The set of electrodes 228 are commonly connected to a conductor bar 234 while the sets of electrodes 230 and 232 are respectively connected to conductor bars 236 and 238. The bar 238 is preferably formed adjacent the bar 234, being electrically insulated therefrom by a layer 240 of insulating material, such as silicon oxide. Although not specifically illustrated in FIG. 14, the overlap length of the electrodes 228, 230 and 232 of each tap of the sections of the filter of FIG. 13, may vary in accordance with a weighting function, such as described earlier with regard to the single phase filter of FIG. 1.

Returning to FIG. 13, the taps are connected in parallel in three groups. The three groups of taps are connected to a six-pole, three position switch for applying phased voltages to the taps. The first group consists of the first, fourth, seventh, etc. taps, the second group consists of the second, fifth, eighth, etc. taps and the third group consists of the third, sixth, ninth, etc. taps. Only six taps are illustrated in FIG. 13.

Conductor bar 234 for the first group consisting of the parallel combination of taps 214 and 220 are connected to a lead line 248 and the conductor bar 238 for these taps is connected to a lead line 250. Conductor bar 236 for these taps is connected to a lead line 252. The lines 248, 250 and 252 are attached to the lower three wiper arms of a six-pole, three-position switch 254. Each of the wiper contacts of the switch 254 are connected to one of three input lines 256–258.

Conductor bar 234 for the second group consisting of the parallel combination of taps 216 and 222 is connected to a lead line 262 which in turn is connected to the input line 256. The conductor bar 238 for this second group is connected to a lead line 266 which in turn is connected to the input line 256. In a similar arrangement, the conductor bar 236 is tied to a lead line 270 which connects to the input line 258.

In a similar manner the third group consisting of the parallel combination of taps 218 and 224 is connected to the top three poles of the switch 254 through input lines 274, 275, and 276.

With the switch 254 in the position shown, an input signal applied to the lines 256–258 is connected to all taps 214–224 with zero degrees phase displacement. With the switch 254 in the middle contact position, an input signal applied to the lines 256–258 is connected to taps 214 and 220 with a positive 120° displacement, and the signal applied to taps 218 and 224 having a negative 120° displacement. The phase on taps 216 and 222 remains unchanged. With the switch 254 in the bottom contact position, an input signal applied to the lines 256–258 is connected to taps 214 and 220 with a positive 240° phase displacement and the signal applied to taps 218 and 224 having a negative 240° phase displacement. The phase on taps 216 and 222 again remains unchanged.

By changing the movable contacts of the switch 254 to each of the three positions, a change in phase between the groups takes place resulting in an interchange in the band pass and band stop regions of the filter. Each of the taps contributes to the composite elastic wave generated in the substrate 226; however, the elastic wave contribution from each of the various taps produces a contribution the output signal at a transducer 272 that has a displacement depending upon the position of the switch 254. Thus, by separating the filter into three groups and providing three sets of electrodes for each tap of each group, a three-phase transversal filter having selectable band pass and band stop regions results.

As an extension of the embodiment of the filter shown in FIGS. 13 and 14, an arrangement such as illustrated in FIG. 7 is possible. In this variation, each of the filter sections as described in FIG. 7 will be replaced by the filter sections as described with regard to FIG. 13. Also, the switching arrangement of FIG. 13 will be used instead of the switching arrangement as illustrated in FIG. 7.

While several embodiments of the invention, together with modifications thereof, have been described in detail therein and shown in the accompanying drawings, it will be evident that various further modifications are possible without departing from the scope of the invention.

What is claimed is:

1. A transversal frequency filter comprising:
a piezoelectric substrate,
a first filter section having a first tap of substantially parallel spaced interdigital electrodes defined on said substrate, and at least one additional tap of substantially parallel spaced interdigital electrodes defined on said substrate each spaced a predetermined distance from said first tap,
a second filter section having a first tap of substantially parallel spaced interdigital electrodes defined on said substrate, and at least one additional tap of substantially parallel spaced interdigital electrodes defined on said substrate each spaced a predetermined distance from said first tap,
switching means for coupling to said filter sections, said switching means having a first position for coupling in phase to said first and second sections and a second position for coupling to one of said sections with a 180° phase displacement from the signal of said other section, and
means for providing an electrical connection for said filter.

2. A transversal frequency filter as set forth in claim 1 wherein the overlap length of the electrodes of each tap of said first and second filter sections varies in accordance with an approximation of the function sin $x/x$.

3. A transversal frequency filter as set forth in claim 1 wherein the first tap of each additional tap of said first filter section are oriented in a first direction on said substrate, and the first tap of each additional tap of said second filter section are oriented in a direction opposite to taps of said first section.

4. A transversal frequency filter as set forth in claim 1 wherein the spacing between electrodes of said taps is related to the center frequency of the filter bandwidth.

5. A transversal frequency filter as set forth in claim 1 wherein the overlapping length of each additional tap of said filter sections after said first tap is related to a given time harmonic.

6. A transversal frequency filter as set forth in claim 1 wherein the overlapping length of the electrodes of each tap of said filter sections forms a pattern related to the bandwidth of frequencies passed by said filter.

7. A transversal frequency filter system, comprising:
a piezoelectric substrate,
a first filter having a first tap of substantially parallel spaced interdigital electrodes defined on said substrate, and at least one additional tap of substantially parallel spaced interdigital electrodes defined on said substrate each spaced a predetermined distance from said first tap,
a second filter having a first tap of substantially parallel spaced interdigital electrodes defined on said substrate, and at least one additional tap of substantially parallel spaced interdigital electrodes defined on said substrate, each tap spaced a predetermined distance from said first tap,
switching means coupled to said first and second filters for selectively controlling the phase relationship of input signals applied to said first and second filters, and
means coupled to said substrate for detecting the output signal generated by said filter system.

8. A transversal frequency filter system as set forth in claim 7 wherein the overlap length of the electrodes of each tap varies in accordance with an approximation of the function sin $x/x$.

9. A transversal frequency filter system as set forth in claim 8 wherein the outline of the overlapping electrodes as varying in accordance with the function sin $x/x$ is related to the overall bandwidth of the passed frequency for each filter.

10. A transversal frequency filter system as set forth in claim 7 wherein the spacing between electrodes of said tap is related to the desired center frequency of each of said filters.

11. A transversal frequency filter system as set forth in claim 7 wherein the electrodes of each additional tap of said filters has an overlapping length related to a time harmonic of the periodicity of a band pass - band stop periodicity in the frequency domain.

12. A transversal frequency filter system, comprsing:

a piezoelectric substrate, a first filter including a first filter section having a first tap of substantially parallel spaced interdigital electrodes defined on said substrate, and at least one additional tap of substantially parallel spaced interdigital electrodes defined on said substrate, each spaced a predetermined distance from said first tap, said first filter further including a second filter section having a first tap of substantially parallel spaced interdigital electrodes defined on said substrate, and at least one additional tap of substantially parallel spaced interdigital electrodes defined on said substrate each spaced a predetermined distance from said first tap, a second filter including a first filter section having a first tap of substantially parallel spaced interdigital electrodes defined on said substrate, and at least one additional tap of substantially parallel spaced interdigital electrodes defined on said substrate each spaced a predetermined distance from said first tap, said additional filter further including a second filter section having a first tap of substantially parallel spaced interdigital electrodes defined on said substrate, and at least one additional tap of substantially parallel spaced interdigital electrodes defined on said substrate each spaced a predetermined distance from said first tap, and first and second coupling means one connected to the first and second filter sections of each of said filters, each of said coupling means having a first position for connecting a signal to each of said filter sections in phase and having at least one additional position for connecting a signal to the first of said sections in each filter with a phase displacement from the signal supplied to the second section of each filter.

13. A transversal frequency filter system as set forth in claim 12 including:

a second piezoelectric substrate, a first filter section having a first tap of substantially parallel spaced interdigital electrodes defined on said second substrate for generating a signal responsive condition in said crystal, and at least one additional tap of substantially parallel spaced interdigital electrodes defined on said second substrate each spaced a predetermined distance from said first tap for generating an additional signal responsive condition, a second filter section having a first tap of substantially parallel spaced interdigital electrodes defined on said second substrate for generating a signal responsive condition in said crystal, and at least one additional tap of substantially parallel spaced interdigital electrodes defined on said second substrate each spaced a predetermined distance from said first tap for generating an additional signal responsive condition, switching means connected to said coupling means of said second filter for coupling a signal to said filter sections on said second substrate, said switching means having a first position for applying the input signal in phase to said first and second sections on said second substrate and at least one additional position for applying the signal to one of said sections to produce a phase displacement from the signal applied to said other section, and means defined for providing an electrical connection for said filter system.

14. A transversal frequency filter system as set forth in claim 13 wherein the overlap length of each electrode in the taps of said filters varies in accordance with an approximation of the function sin $x/x$.

15. A transversal frequency filter system as set forth in claim 14 wherein the overlap length of each electrode in the taps of said filters is related to the overall bandwidth of the frequencies passed by each of said filters.

16. A transversal frequency filtering system as set forth in claim 15 wherein the spacing between electrodes of each tap of said filter is related to the desired center frequency of each filter bandwidth.

17. A transversal frequency filtering system as set forth in claim 13 wherein said switching means includes a switch having a first position for applying an input signal in phase to said first and second sections of said filter and a second position for applying the signal to one of said sections to produce a 180° phase displacement from the signal applied to said other section.

18. A surface wave frequency filtering system, comprising:

a first filter including a first filter section having a first tap of substantially parallel spaced interdigital electrodes defined on a substrate, and at least one additional tap of substantially parallel spaced interdigital electrodes defined on the same substrate each spaced a predetermined distance from said first tap, said filter further including a second filter section having a first tap of substantially parallel spaced interdigital electrodes defined on said substrate, and at least one additional tap of substantially parallel spaced interdigital electrodes defined on the same substrate each spaced a predetermined distance from said first tap, said filter further including means for providing an electrical connection to said filter sections, said means having a first position for connecting in phase to said first and said second sections and a second position for connecting to one of said sections with a 180° phase displacement from said other sections, and means for providing an output terminal for said filter, at least one additional filter each including a first section having a first tap of substantially parallel spaced interdigital electrodes defined on a substrate for, and at least one additional tap of substantially parallel spaced interdigital electrodes defined on the substrate each spaced a predetermined distance from said first tap, said additional filter including a second filter section having a first tap of substantially parallel spaced interdigital electrodes defined on the same substrate, and at least one additional tap of substantially parallel spaced interdigital electrodes defined on said substrate each spaced a predetermined distance from said first tap, each of said additional filters further including output means defined on the substrate for providing an output terminal for said filter, and means for coupling each of said additional filters to said first filter in a "tree" arrangement, said means coupling to the filter sections and having a first position for applying a signal in phase to the first and second sections of a respective filter and a second position for applying a signal to one of said sections of the respective filter to produce a 180° phase displacement from the signal applied to said other sections.

19. A surface wave frequency filtering system as set forth in claim 18 wherein the overlap length of each electrode in the taps of each filter varies in accordance with an approximation of the function sin $x/x$.

20. A surface wave frequency filtering system as set forth in claim 19 wherein the spacing between electrodes of each tap of said filters is related to the desired center frequency of each filter bandwidth.

21. A transversal frequency filter comprising:

a piezoelectric substrate, a first filter section having a first tap including a first set of substantially parallel electrodes defined on said substrate, a second set of substantially parallel electrodes defined on said substrate interleaved with said first set of electrodes and a third set of substantially parallel electrodes defined on said substrate interleaved with said first and second arrays of electrodes, said first filter section including at least one additional tap each having a first set of substantially parallel electrodes defined on said substrate, a second set of substantially parallel electrodes defined on said substrate interleaved with said first set of electrodes and a third set of substantially parallel electrodes defined on said substrate interleaved with said first and second sets of electrodes, each additional tap spaced a predetermined distance from said first tap, a second filter section having a first tap with a first array of substantially parallel electrodes defined on said substrate, a second array of substantially parallel electrodes defined on said substrate interleaved with said first set of electrodes and a third set of substantially parallel electrodes defined on said substrate interleaved with said first and second sets of electrodes, said second filter section having at least one additional tap with a first set of substantially parallel electrodes defined on said substrate, a second set of substantially parallel electrodes defined on said substrate interleaved with said first set of electrodes, and a third set of substantially parallel electrodes defined on said substrate interleaved with said first and second sets of electrodes, each additional tap spaced a predetermined distance from said first tap, means for coupling an input signal to said filter sections, said means having a first position for applying an input signal in phase to said first and second sections, a second position for applying a signal to one of said sections with a 120° phase displacement from a signal applied to said other section, and a third position for applying a signal to one of said sections with a 240° phase displacement from the signal applied to said other section, and means defined on said substrate for providing a connection for said filter.

22. A transversal frequency filter as set forth in claim 21 wherein said first, second and third sets of electrodes respectively for each of said filter section taps has a periodicity corresponding to one acoustic wavelength of the center frequency of a filtering bandwidth.

23. A transversal frequency filter as set forth in claim 21 wherein the overlap length of the electrodes of each tap of said first and second filter sections varies in accordance with an approximation of the function sin x/x.

24. An acoustic surface wave transversal frequency filter comprising:

a piezoelectric substrate, a plurality of filter sections defined on said substrate along a common acoustic channel at preselected spaced loctions, each of said filter sections defined by a plurality of interleaved parallel electrodes defining a preselected center frequency, the electrode overlap of adjacent electrodes in each filter section defining a selected weighting function corresponding to the desired filter function, preselected ones of said plurality of filter sections spaced on said substrate at loctions corresponding to harmonics of said center frequency, the overlap of respective electrodes of said preselected filters defining a fraction of the corresponding electrode overlap of filter sections disposed at locations corresponding to the fundamental mode of said center frequency, means coupled to said filter sections for simultaneously applying an input signal thereto, said filter sections effective responsive to said input signal, to generate an acoustic surface wave in said substrate corresponding to the filter function defined by said filter sections; and means disposed on said substrate along said acoustic channel for detecting acoustic surface waves propagating therealong and providing electrical output signals responsive thereto.

25. A transversal frequency filter as set forth in claim 24 wherein said plurality of filter sections comprise:

first and second filter sections disposed on said substrate adjacent one another along a common acoustic channel, thereat defining the fundamental mode of said center frequency; adjacent electrodes thereof defining a maximum overlap corresponding to a preselected weighting function; and third and fourth filter sections disposed along said acoustic channel respectively adjacent said first and second sections, spaced therefrom by a distance corresponding to a preselected harmonic of said center frequency, the overlap of adjacent electrodes of said third and fourth sections defining a fraction of said maximum overlap of corresponding adjacent electrodes of said first and second sections.

26. A transversal frequency filter as set forth in claim 25 wherein said preselected weighting function substantially corresponds to the function sin $x/x$.

27. A transversal frequency filter as set forth in claim 24 wherein said means for coupling an input signal to said filter sections includes switching means for selectively controlling the phase relationship between respective filter sections.

* * * * *